(12) United States Patent
Velayudhan et al.

(10) Patent No.: US 11,290,373 B2
(45) Date of Patent: *Mar. 29, 2022

(54) METHOD AND SYSTEM TO AVOID TEMPORARY TRAFFIC LOSS WITH BGP ETHERNET VPN MULTI-HOMING WITH DATA-PLANE MAC ADDRESS LEARNING

(71) Applicant: Dell Products LP, Round Rock, TX (US)

(72) Inventors: Mukesh Moopath Velayudhan, Fremont, CA (US); Phaniraj Vattem, Santa Clara, CA (US); Anoop Ghanwani, Roseville, CA (US)

(73) Assignee: Dell Products LP, Round Rock, TX (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/692,163

(22) Filed: Nov. 22, 2019

(65) Prior Publication Data

US 2020/0092200 A1  Mar. 19, 2020

Related U.S. Application Data

(63) Continuation of application No. 15/672,164, filed on Aug. 8, 2017, now Pat. No. 10,536,370.

(51) Int. Cl.
*H04L 12/703* (2013.01)
*H04L 29/12* (2006.01)
*H04L 45/28* (2022.01)
*H04L 43/0811* (2022.01)
*H04L 45/00* (2022.01)
(Continued)

(52) U.S. Cl.
CPC .......... *H04L 45/28* (2013.01); *H04L 43/0811* (2013.01); *H04L 45/22* (2013.01); *H04L 45/66* (2013.01); *H04L 61/10* (2013.01); *H04L 41/0663* (2013.01); *H04L 45/04* (2013.01); *H04L 45/50* (2013.01); *H04L 61/6022* (2013.01)

(58) Field of Classification Search
CPC ..... H04L 12/24; H04L 12/44; H04L 41/0663; H04L 41/12; H04L 45/50; H04L 43/0811; H04L 45/22; H04L 45/28; H04L 45/48; H04L 61/10; H04L 45/04; H04L 45/66; H04L 61/6022

See application file for complete search history.

(56) References Cited

U.S. PATENT DOCUMENTS

| 2014/0003227 | A1* | 1/2014 | Scudder | H04L 45/021 370/218 |
| 2020/0014623 | A1* | 1/2020 | Wang | H04L 12/46 |

* cited by examiner

*Primary Examiner* — Michael Thier
*Assistant Examiner* — Prince A Mensah
(74) *Attorney, Agent, or Firm* — Staniford Tomita LLP

(57) ABSTRACT

Embodiments are directed to a process and system for avoiding temporary traffic loss in a network having first and second computers and provider edge devices, by retaining, in each provider edge device, path information including a MAC address for the first host computer in a control plane as a dynamic address, and maintaining, in each provider edge device, its own routing table listing network addresses of the other provider edge devices as multi-homed peers. A failure recovery process in each provider edge devices advertises all multi-homed peer network addresses as addresses that each respective provider edge device has dynamically learnt in the control plane such that when a provider edge device receives a route with a locally connected host, it re-advertises the host address on its own.

20 Claims, 6 Drawing Sheets

(51) Int. Cl.
*H04L 61/10* (2022.01)
*H04L 41/0663* (2022.01)
*H04L 45/50* (2022.01)
*H04L 101/622* (2022.01)

METHOD AND SYSTEM TO AVOID TEMPORARY TRAFFIC LOSS WITH BGP ETHERNET VPN MULTI-HOMING WITH DATA-PLANE MAC ADDRESS LEARNING

CROSS-REFERENCE TO RELATED APPLICATIONS

The present application is a Continuation application of U.S. patent application Ser. No. 15/672,164, filed on Aug. 8, 2017, entitled "Method and System to Avoid Temporary Traffic Loss with BGP Ethernet VPN Multi-Homing with Data-Plane MAC Address Learning," and which is assigned to the assignee of the present application.

TECHNICAL FIELD

Embodiments are generally directed to network interfaces, and specifically to avoiding temporary traffic loss in edge devices in a large-scale Ethernet network.

BACKGROUND

Ethernet VPN (EVPN) and Provider Backbone Bridging EVPN (PBB-EVPN) are next generation solutions that provide Ethernet multipoint services over MPLS networks. EVPN uses the Border Gateway Protocol (BGP) as control-plane for MAC address signaling/learning over the core as well as for access topology and VPN endpoint discovery. EVPN expands current existing Virtual Private LAN Services offerings by using control-plane based MAC learning over the core.

In EVPN networks, a software MAC address table is maintained in the firmware of network switches and/or other router devices. This MAC address table contains the MAC addresses learned on all the interfaces of routers and Ethernet access switches. Dynamic MAC address learning occurs when the bridging data path encounters an ingress frame whose source address is not present in the MAC address table for the ingress service instance. In EVPN, the system learns addresses on access interfaces, and uses a protocol, such as BGP, to learn addresses of the access interfaces on other switches in the network.

The Border Gateway Protocol (BGP) is a standardized exterior gateway protocol designed to exchange routing and reachability information among autonomous systems on the Internet. BGP makes routing decisions based on paths, network policies, or rule-sets configured by a network administrator. Internet Service Providers (ISP) use BGP to establish routing between one another and very large private IP (Internet Protocol) networks may use BGP internally. BGP neighbors are called peers, and are established by manual configuration between routers using TCP as the transport protocol.

For network resiliency through link redundancy, multi-homing techniques are used so that the same customer device is connected to two provider edge devices. In BGP EVPN, when a multi-homed customer MAC address is removed from one of the provider edge devices (PEs) to which it is multi-homed, there is a possibility that it will be temporarily withdrawn from all the PEs in the EVPN even if the MAC address is still reachable from other provider edge devices. This can lead to unwanted traffic loss. What is needed, therefore, is a way to dampen such temporary withdrawal of multi-homed MAC addresses and to remove them only if genuinely non-reachable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
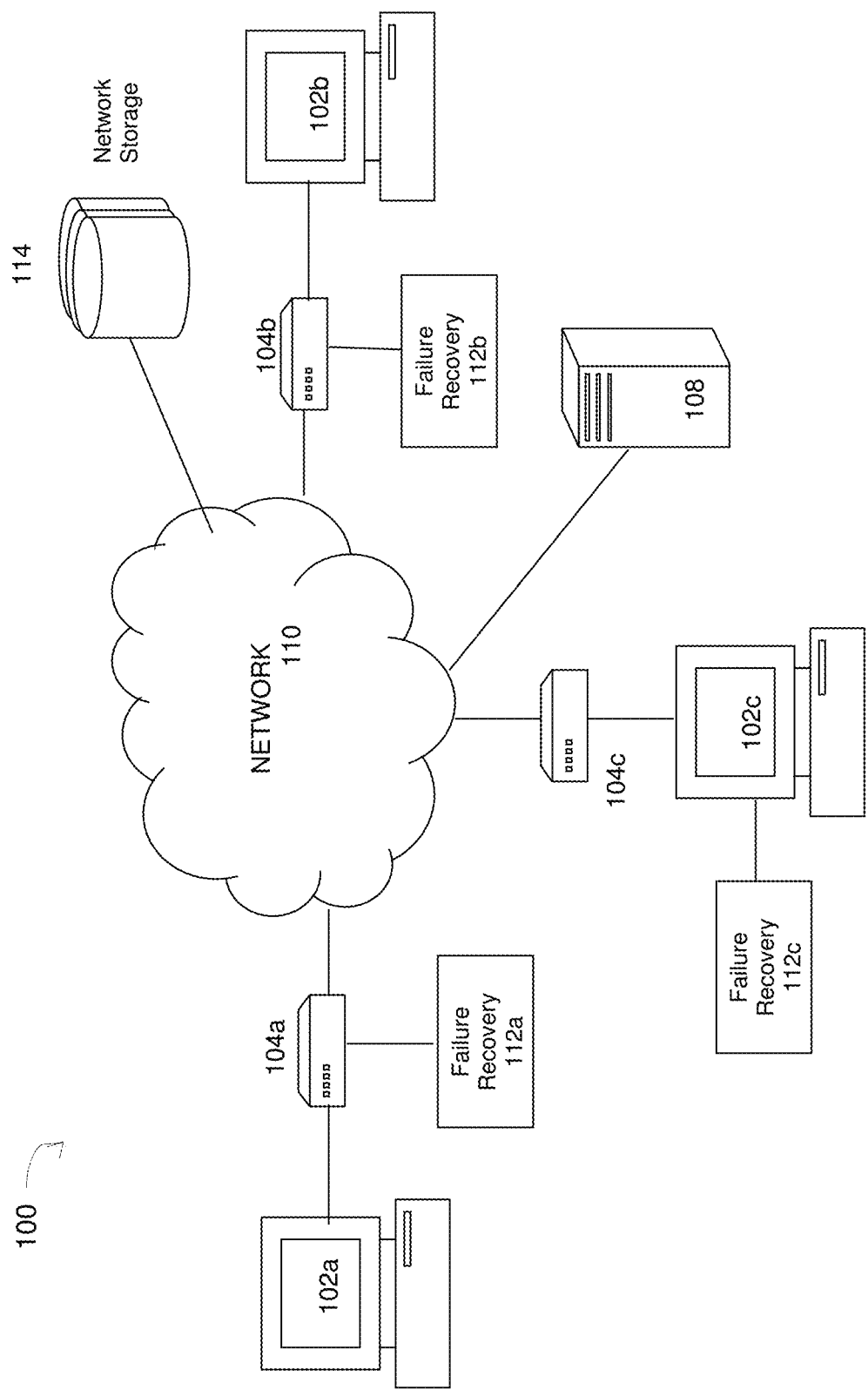
FIG. 1 is a diagram of a computing network implementing a network tuning process for large-scale data transfers, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard-coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve network coding implementation in a very large-scale wide area network (WAN), metropolitan area network (MAN), cloud, or similar distributed network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a method of avoiding temporary traffic loss with multi-homing when used in conjunction with certain device address learning processes. FIG. 1 illustrates a computer network system that implements one or more embodiments of an Internet Protocol (IP) network implementing a failure recovery process that maintains continuous network operation, by minimizing the effect of any temporary withdrawal of multi-homed device addresses and removing the devices only if genuinely non-reachable by other devices. In system 100, a number of computers 102*a-c* are connected to each other over a network 110. The network 110 may represent part of the Internet network that represents a public network (WAN or MAN) that is accessed by users through one or more Internet Service Providers (ISPs). Depending on the application and direction of data traffic, one or more computers 102 may be referred to, or function as hosts, and others may function as targets, though embodiments are not so limited and other terms may be used.

The computers 102*a-c* may represent individual computers operated by individuals or computers that are part of their own private network (LAN) that execute applications using data provided by other resources on the network 110, such as from other computers 102, data sources 114, or other network servers 108. Network 110 provides connectivity to the various systems, components, and resources of system 100, and may be implemented using protocols such as Transmission Control Protocol (TCP) and/or Internet Protocol (IP), well known in the relevant arts. In a cloud computing environment, for example, network 110 represents a network in which applications, servers and data are maintained and provided through a centralized cloud computing platform.

In an embodiment of system 100, the computers 102*a-c* are coupled to network 100 through respective interface devices 104*a-c*. These devices may be embodied as a network switch (e.g., switching hub or bridging hub). In a hardware embodiment, the switch electrically and logically connects together the devices in the system. Multiple data cables are plugged into a switch to enable communication between different networked devices. Switches manage the flow of data across a network by transmitting a received network packet only to the one or more devices for which the packet is intended. Each networked device connected to a switch can be identified by its network address, allowing the switch to regulate the flow of traffic. This maximizes the security and efficiency of the network.

Unless otherwise specified, the terms "router" and "switch" may be used interchangeably to mean a network interface device that connects a host computer to the network, and may represent a switching hub embodied in or as a provider edge (PE) or customer edge (CE) device.

In an Ethernet-based network, each device in the network is identified by a unique network address, which in an embodiment is a media access control (MAC) address. Generally, a MAC address is a unique identifier assigned to network interfaces for communications at the data link layer of a network segment. MAC addresses are most often assigned by the manufacturer of a network interface controller (NIC) and are stored in its hardware, such as the card's ROM (read-only memory) or firmware. A network node may have multiple NICs and each NIC must have a unique MAC address. Certain multilayer switches or routers may require one or more permanently assigned MAC addresses. The switch 104 uses packet switching to receive, process, and forward data to the respective destination device 102. The network switch is a multiport network bridge that uses hardware addresses to process and forward data at the data link layer (layer 2) of the OSI model so, unlike simple network hubs, the network switch forwards data only to the devices that need to receive it, rather than broadcasting the same data out of each of its ports. Some switches can also process data at the network layer (layer 3) by additionally incorporating routing functionality that most commonly uses IP addresses to perform packet forwarding; such switches are commonly known as layer-3 switches or multilayer switches. In an embodiment, switches 104*a-c* may be layer 2 or layer 3 network switches or the equivalent router or other interface device.

It should be noted that network system 100 of FIG. 1 is provided as an example only and any number of computers, servers 108, and other resources may be provided. In addition, one or more computers in system 100 may be virtual machines supported by virtualization technology (e.g., hypervisors). Any number of virtual machines (VMs) or groups of VMs (e.g., organized into virtual centers) may be provided to serve as data sources or targets, such as for backup operations.

In an embodiment, system 100 implements Ethernet VPN (EVPN) technology to provide a wide range of data interconnection services and organize the control plane separately from the data plane. In general, the control plane makes decisions about where network traffic is sent, while the data plane actually moves the packets based on what is learnt in the control plane. Control plane packets are sent to or originated by the router or switch itself. The control plane functions include the system configuration, management, and exchange of routing table information, and the interface hardware exchanges the topology information with other routers and constructs a routing table based on a routing protocol, such as BGP. Control plane packets are processed by the router to update the routing table information, thus representing the signaling functions of the network. The data plane (or "forwarding plane") forwards traffic to the next hop along the path to the selected destination network according to control plane logic. Data plane packets go through the router, and the routers/switches use what the control plane built to dispose of incoming and outgoing frames and packets.

EVPN technology also supports Virtual Extensible LAN (VxLAN), which is a network virtualization technology that addresses the scalability problems associated with large cloud computing deployments. System 100 thus uses a VxLAN-like encapsulation technique to encapsulate MAC-based Ethernet frames within UDP packets endpoints, that terminate VxLAN tunnels and may be both virtual or physical switch ports 104, are known as VxLAN tunnel endpoints (VTEPs). The terms VTEP and PE may refer to the same edge device entity depending on the technology being used.

In an embodiment, system 100 includes processes and components that help prevent, avoid, or minimize temporary traffic loss with border gateway protocol (BGP) EVPN multi-homing when used in conjunction with data-plane MAC address certain device learning processes. Such processes or components may be implemented through software or firmware 112a-c executed by or within respective switch devices 104a-c, as shown in FIG. 1. This functionality may be executed within each switch 104 associated with a computer 102 or only one or some of the switches.

Figure 2:
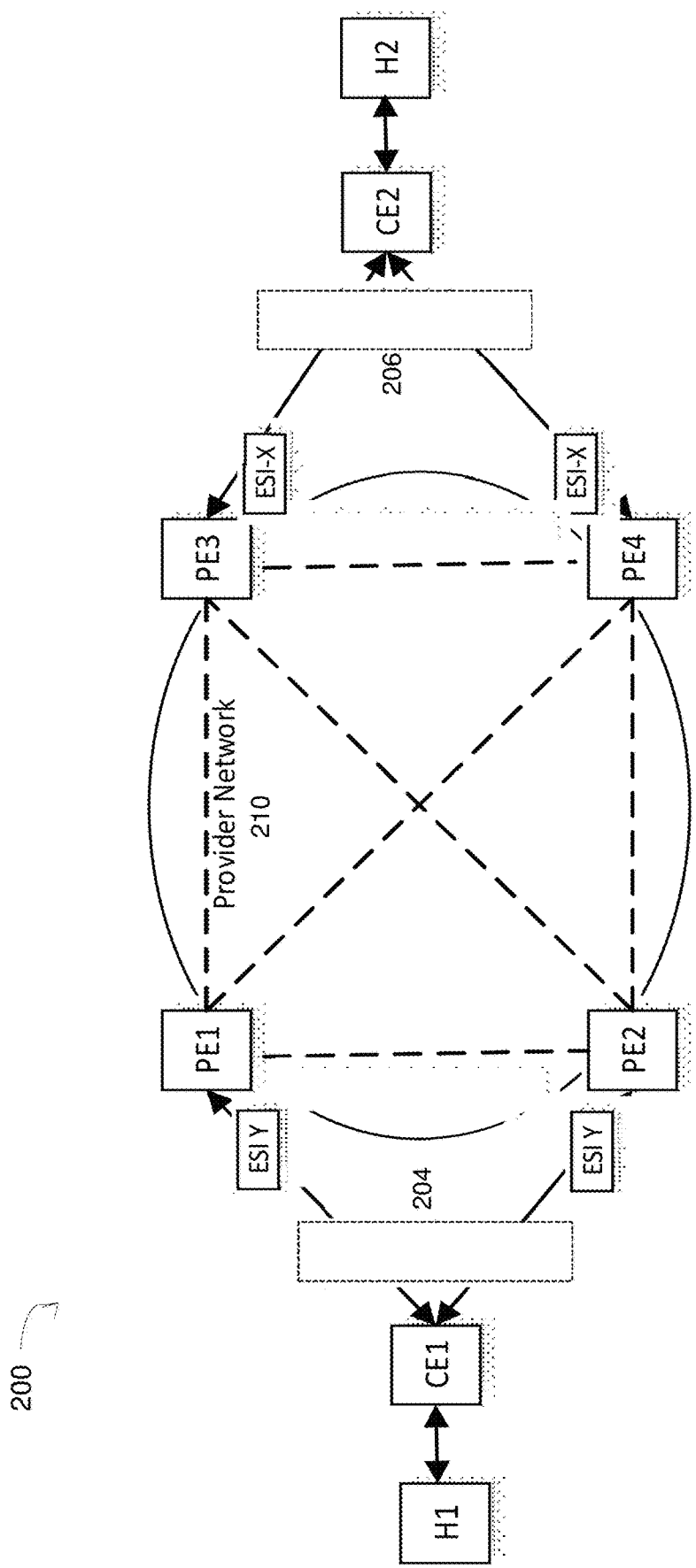
FIG. 2 illustrates a reference Ethernet VPN network that implements a failure recovery process with continuous network operation, under some embodiments.

FIG. 2 illustrates a reference Ethernet VPN network that implements a failure recovery process with continuous network operation, under some embodiments. System 200 depicts a Layer 2 Ethernet VPN (EVPN), where customers attach through host computers H1 and H2 to the provider network 210 through the Provider Edge devices (PE), denoted in FIG. 2 as PE1 to PE4. A provider edge device (PE router) is an edge router participating in the VPN, typically between one ISP's area and areas administered by other network providers. The PE is capable of supporting a broad range of routing protocols including the Border Gateway Protocol (BGP) that controls PE to PE, or PE to CE communication, where the customer edge (CE) device is the router at the customer premises that is connected to the provider edge of a service provider IP network. Thus, as shown in FIG. 2, the customer edge (CE) router CE1 connects host H1 to PE routers PE1 and PE2, and CE2 connects host H2 to PE3 and PE4. The provider network 210 uses VxLAN tunneling between the PEs with IP routing as underlay for packet forwarding in the data-plane. In an embodiment, the PEs run BGP-EVPN (e.g., as per RFC-7432 and draft-ietf-bess-evpn-overlay) in the control-plane to communicate and distribute information with each other. It should be noted that hosts can also be connected directly to the PEs without a CE.

As shown in FIG. 2, network 200 implements multi-homing using BGP. This allows an edge device (e.g., CE1 or CE2) to uplink to two switches for redundancy, while having only a single bundle interface to manage. Thus, as shown in FIG. 2, the customer edge devices (CE) in the customer network are multi-homed to at least two PEs via multi-homing for resiliency. That is, CE1 is multi-homed to PE1 and PE2 through multi-homing function 204, and CE2 is multi-homed to PE3 and PE4 through multi-homing function 206. In embodiments, certain link aggregation (LAG) mechanisms may be used to implement multi-homing. One such mechanism is VLT (Virtual Link Trunking), which is provided for switches from Dell Networking.

For communication across the network, the MAC addresses of the customer devices must be learned by the provider edge devices and then advertised using BGP to the other provider edge devices. For the embodiment of FIG. 2, each PE learns about the MAC addresses in its local customer network using data-plane MAC learning from incoming packets. These MAC addresses are then advertised to all the PEs in the EVPN using the new BGP EVPN NLRI (MAC/IP Advertisement Route). The remote PEs in-turn install these MAC addresses as static MAC addresses pointing to the VxLAN tunnel corresponding to the PE that generated the BGP EVPN MAC route, in their data-plane MAC tables. All PEs to which a CE is multi-homed are called multi-homed peers. Each multi-homed peer independently learns the customer MAC address using data-plane MAC learning. Due to certain packet hashing operations, a given multi-homed PE may learn only a subset of the customer MAC addresses directly using data-plane MAC learning; it then learns the rest of the MAC addresses from the BGP EVPN control-plane. All PEs multi-homed to a CE use the same Ethernet Segment Identifier (ESI) to denote the link connecting the PE to the CE. Thus, as shown in FIG. 2, PE1 and PE2 use ESI-Y to connect to CE1, and PE3 and PE4 use ESI-X to connect to CE2. A PE can determine whether a given MAC address is reachable locally or via remote PEs using the ESI advertised for the MAC in the BGP EVPN route.

Figure 3:
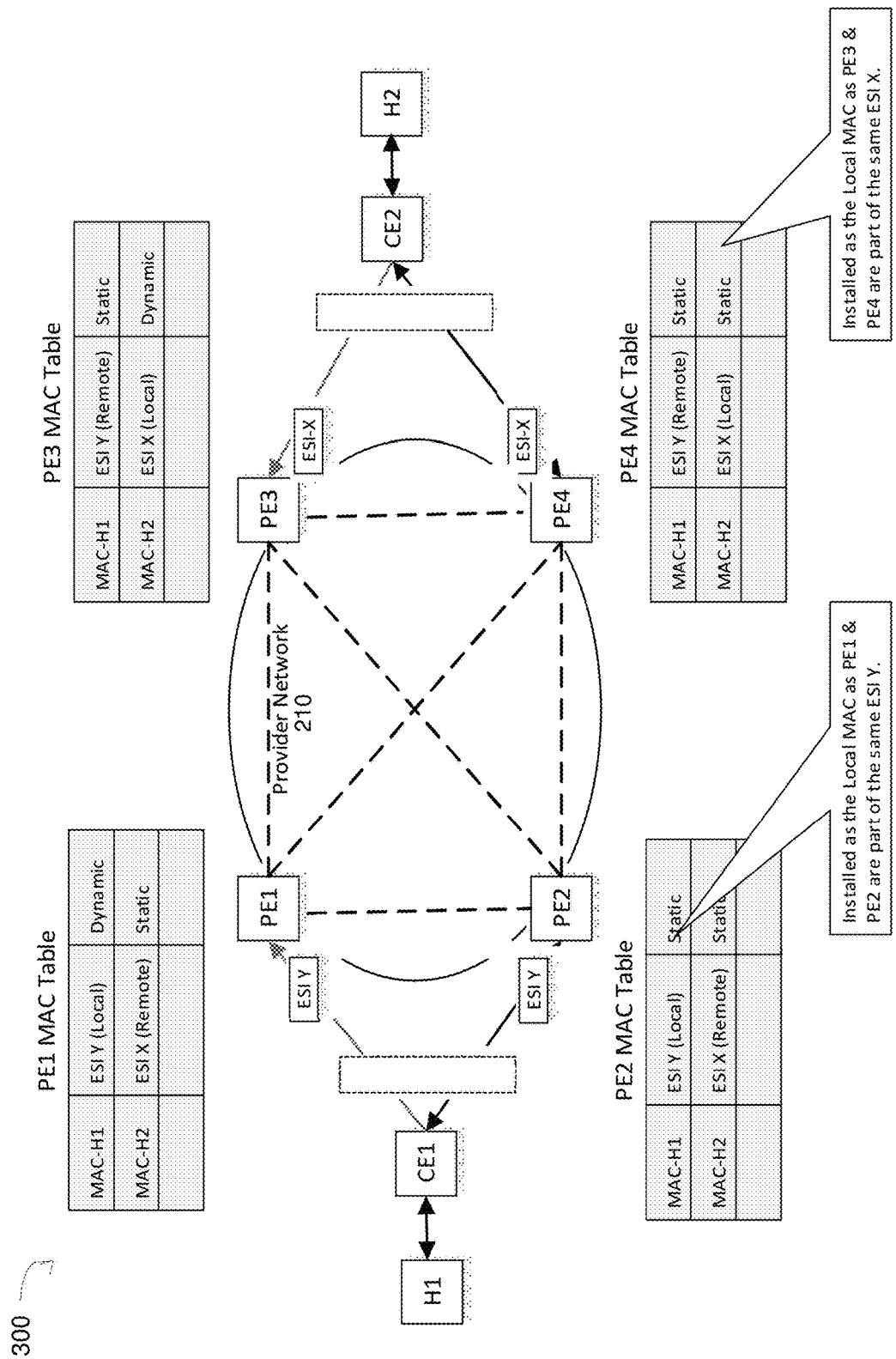
FIG. 3 illustrates the example network of FIG. 2 with MAC address tables populated with example values, under some embodiments.

FIG. 3 illustrates the example network of FIG. 2 with MAC address tables populated with example values, under some embodiments. In this example, PE1 and PE2 are attached to the same Ethernet Segment ESI-Y. The traffic from host H1 is initially hashed to PE1 and traffic from H2 is hashed to PE3. Provider edge device PE1 advertises the following information to all PEs using BGP EVPN MAC/IP Advertisement Route: H1 is reachable on ESI Y. PE2 receives this advertisement and finds that it is attached to the same ESI as it received in the advertised route. So, PE2 installs this MAC address in its data-plane pointing to its own local link towards H1. Provider edge devices PE3 and PE4 install this MAC address in their data-plane pointing to their VxLAN tunnels towards PE1. It should be noted for this example, that since ESI-Y is advertised by both PE1 and PE2, PE3 and PE4 know that the MAC is reachable from both PEs. Hence, they can also install an ECMP path for H1 in the data-plane pointing to both PE1 and PE2 VxLAN tunnels. Provider edge devices PE3, PE4 can hash traffic from H2 to H1 to both PE1 and PE2.

As shown in FIG. 3, each provider edge device in network 300 has a respective associated MAC address table. Thus, PE1 has a PE1 MAC address table, PE2 has a PE2 MAC address table, PE3 has a PE3 MAC address table, and PE4 has a PE4 MAC address table. These tables are shown with certain example entries. As shown for the PE2 MAC address table, the MAC-H1 is installed as the local MAC address as PE1 and PE2 are attached to the same ESI-Y; and for the PE4 MAC address table, the MAC-H2 is installed as the local MAC address as PE3 and PE4 are attached to the same ESI-X.

Figure 4:
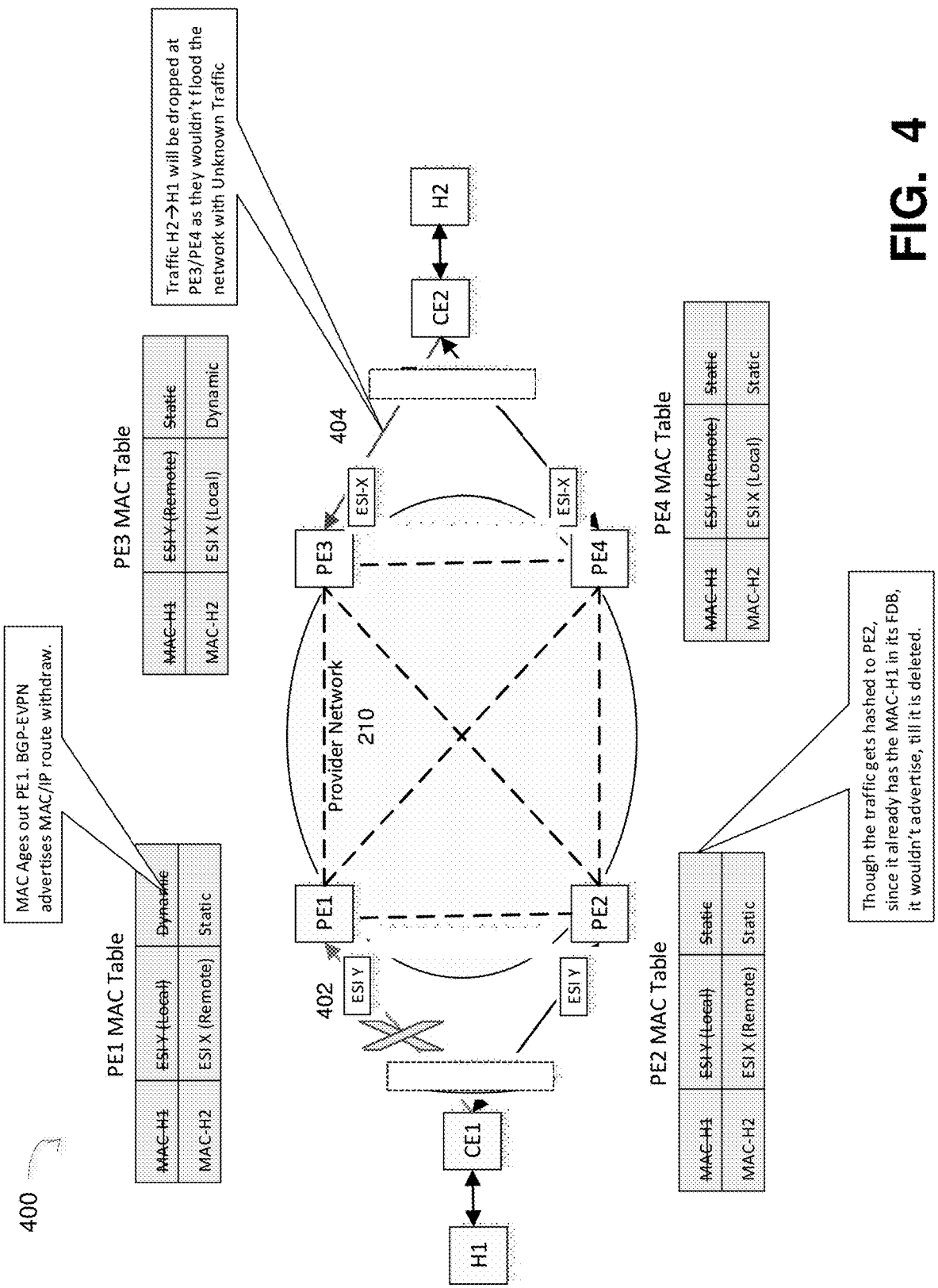
FIG. 4 illustrates the example network of FIG. 2 with MAC address tables modified by certain example link failures, under some embodiments

In order to avoid overwhelming the provider network 210 with packet flooding, only packets with a known destination MAC are sent on VxLAN tunnels. Flooding packets with an unknown MAC address to all VxLAN tunnels may be disabled in the data-plane through a feature or configuration mechanism. This feature can lead to certain instances of data loss, as described in the Background section above. A multi-homed PE peer could lose a customer MAC address it learnt from the data-plane in certain scenarios. FIG. 4 illustrates the example network of FIG. 2 with MAC address tables modified by certain example link failure scenarios, under some embodiments. FIG. 4 represents the network state after two failure scenarios. One such scenario is the case of PE-CE link failure as shown by the cut link 402 between PE1 and CE1.

In a second scenario, the traffic from the CE hashes to a different multi-homed PE, in which case, the original PE that learnt the MAC eventually ages out the MAC address. For example, as shown FIG. 4 for network 400, if the traffic from CE1 hashes to PE2 instead of PE1, Host H1's MAC address at PE1 ages out and withdraws this MAC address. Note that due to the way data-plane MAC address learning works, the new PE to which the traffic has now hashed will not advertise this MAC address since it was already installed in its data-plane MAC address table using BGP EVPN distribution.

In both of the example failure scenarios described above, at PE when the locally learnt MAC address gets aged out, it instructs the BGP EVPN control plane to withdraw the corresponding EVPN route. This in turn causes the MAC address to be removed in all the PEs in the EVPN. All the PEs (including the multi-homing peers) would remove H1 from their MAC tables in the data-plane, as shown in the modified MAC tables for PE1 to PE4. Since flooding of unknown unicast traffic into the flooding is disabled, the traffic from H2 to H1 will be dropped at PE3/PE4 for a short time. The traffic will recover again when PE2 learns the MAC address in its data-plane and distributes it again using BGP EVPN to all the PEs. Thus, in certain cases, packet loss may occur even when EVPN multi-homing resiliency should avoid such loss.

To overcome this problem, the failure recovery process 112 is implemented in each appropriate network switch. In one embodiment, the failure recovery process causes all multi-homed peers to advertise all local customer MAC addresses in their BGP EVPN control plane. That is, whenever a PE receives a MAC EVPN route with a locally connected ESI, it can re-advertise the same MAC address on its own as though it has learnt this MAC address. Thus, with reference to example networks of FIGS. 2 and 3, PE2 receives the MAC H1 route from PE1 with destination as ESI-Y. Since it knows that this ESI is locally reachable, PE2 re-advertises this MAC address as its own MAC address using BGP EVPN. The BGP on PE3 and PE4 will mark that both PE1 and PE2 have advertised the same MAC EVPN route for H1. Hence, even if PE1 withdraws this MAC route PE3 and PE4 (as shown in the post-failure state of FIG. 4), it will not remove the MAC address for H1 from their data-plane. This solution, however, may lead to doubling of the number of MAC addresses that needs to be maintained in the control-plane, which can lead to scalability issues and an overall slowing down of the performance on each PE. This effect is exacerbated when each CE is multi-homed to more than two PEs.

Figure 5:
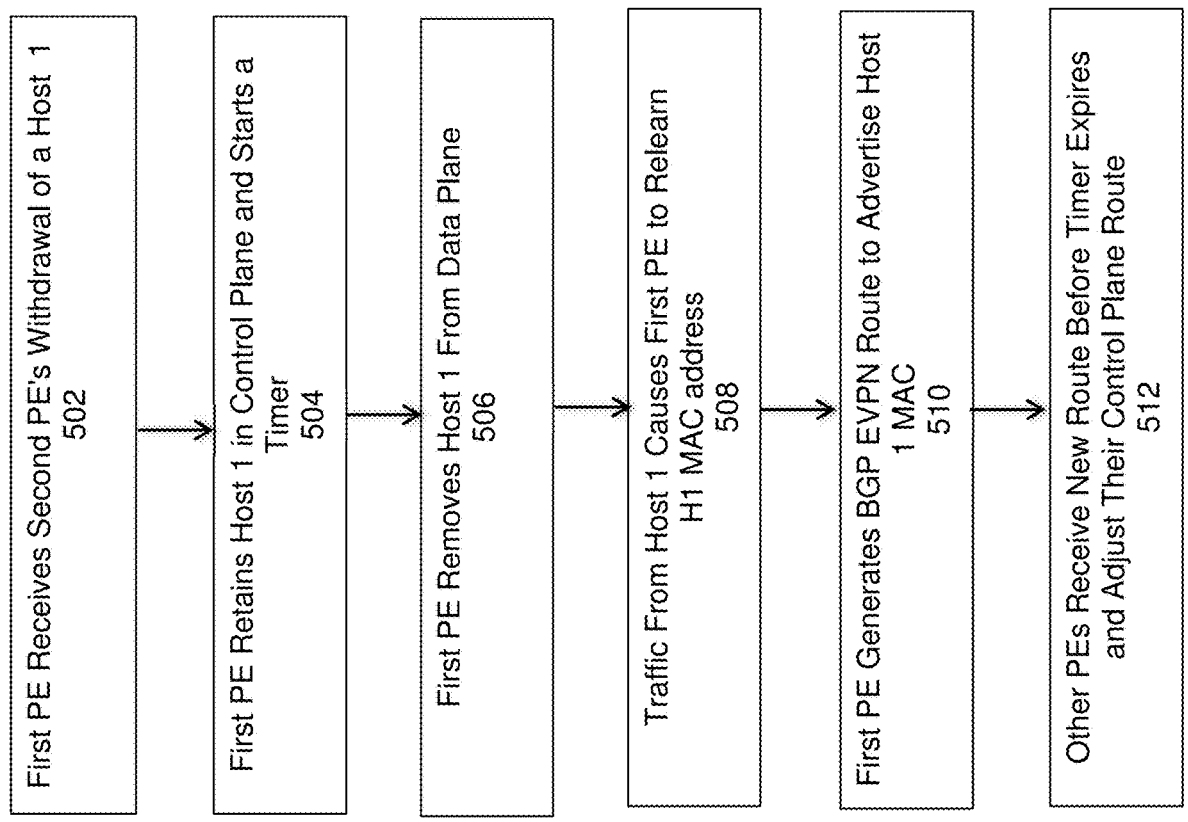
FIG. 5 is a flowchart that illustrates a method of recovering from data link failure without traffic loss, under some embodiments.

In an alternative embodiment, the failure recovery process 112 causes each PE to keep track of the number of PEs that have advertised an ESI and uses a timer to control modification of the data plane, new re-advertising of the host MAC address, and re-generation of the Ethernet VPN route for the other PEs. FIG. 5 is a flowchart that illustrates a method of recovering from data link failure without traffic loss, under some embodiments. When a MAC address is withdrawn from PE, if the MAC address is learnt on an ESI reachable from multiple PEs, then the PE that receives the withdrawal will not remove the MAC address from its control plane, but instead will start a timer. Thus, process 500 begins (502) with a first PE (e.g., PE2) receiving notice of a second PE's (e.g., PE1) withdrawal of a first host (e.g., H1) due to a failure condition, such as illustrated in FIG. 4. The first PE retains H1 in the control plane and starts a timer, step 504. The first PE then removes H1 from the data plane, step 506, which may cause temporary flooding. Traffic from H1 causes PE2 to relearn the H1 MAC address in the data-plane, step 508. This causes PE2 to re-advertise the MAC address as its own using BGP to all the other PEs. The first PE thus generates the BGP EVPN route to advertise the H1 MAC address, 510. Other PEs receive the new route before the timer expires, and adjust their control plane route accordingly, 512.

In another alternative embodiment, instead of 506-510, the first PE can retain the MAC address in the data plane as a dynamic address and start advertising the H1 MAC address as one that it has learnt. In the event that the address ages out, the H1 MAC would be withdrawn from other peers. In the case where there are more than two peers, the peer with the lower address would perform this operation. If the peer with the next higher address does not see an advertisement for H1 MAC within a certain specified time, it can take ownership of the address.

In an embodiment, the time period set by the timer is related to the amount of time required to remove a host's MAC address at the provider edge device and withdraw that MAC address. During the time period, the process waits for the MAC address to be re-advertised from one of the multi-homed peers and does nothing until then. When it receives the MAC address re-advertisement, the timer is stopped. If the timer expires before re-advertisement, then the MAC address is removed from the control plane and data plane. The period of the timer is thus related to the amount of time required to: (1) remove a MAC address from the data-plane, (2) re-learn the MAC address in the data-plane to generate the BGP route advertisement and transmit it to the other devices, (3) propagate the BGP route through the provider network, and (4) receive and process the BGP route in the local PE.

The following examples illustrate example implementations of this alternative embodiment in the case of failures such as those illustrated in FIG. 4. In a first example, PE3 and PE4 receive PE1's withdrawal for H1. PE3 and PE4 know that H1 is reachable on ESI-Y, which is connected to both PE1 and PE2. PE3 and PE4 retain H1 and start a timer. In the case of a PE-CE link failure (e.g., broken link 402), the PE additionally withdraws ESI as well. In this case, the remote PEs should remove this PE from their ECMP path for the MAC address.

In a second example, if the PE1 to CE1 link fails, PE1 first withdraws ESI-Y in the BGP, before withdrawing all the MAC addresses learnt on ESI-Y. PE3 and PE4 receive PE1's withdrawal for ESI-Y. PE3 and PE4 remove the VxLAN tunnel for PE1 from their ECMP path for H1. Traffic for H1 will now be forwarded only to PE2. The multi-homed peer PEs that see the withdrawal removes the MAC from their data-plane alone. This is to ensure that one of the multi-homed peers learns the MAC address again causing the MAC address to be re-advertised in the control plane. If such a link between PE1-CE1 fails, PE1 would withdraw the Ethernet A-D per-ES route, and then PE1 withdraws MAC addresses learnt from Host H1. Thus, as shown in FIG. 4, in the case of link 402 being cut, the PE1 MAC address table is modified by PE1 being aged out and the BGP-EVPN advertises MAC/IP route withdrawal.

In a third example, PE2 receives PE1's withdrawal for H1. PE2 knows that ESI-Y is locally reachable as well. PE2 retains H1 in its control plane and starts a timer. PE2 removes H1 from its data-plane. Traffic to H1 will be temporarily flooded on PE2 but still reach H1. PE2 receives traffic from H1. PE2 generates the BGP EVPN route to advertise MAC H1 on ESI-X. PE3 and PE4 receive this route before their timer expires and adjust the control plane route without disturbing the data-plane entry for H1.

With the process of FIG. 5, the recovery from the failure scenario happens without disturbing the data-plane entry on the remote PEs, thus avoiding traffic drop on the remote PEs. This result is achieved without multiplying the number of routes in the control-plane.

The network server computers and client computers shown in FIGS. 1 and 2 are coupled together over a network that may be a LAN, WAN or other appropriate network. The network provides connectivity to the various systems, components, and resources of the system, and may be implemented using protocols such as Transmission Control Protocol (TCP) and/or Internet Protocol (IP) as in hypertext transport protocols (HTTP), well known in the relevant arts. For network coding environments, the network may comprise ad hoc networks, multicast switches, wireless networks, p2p (peer-to-peer) messaging, SDN networks, and Internet of Things (IoT) application networks, among other appropriate networks.

Figure 6:
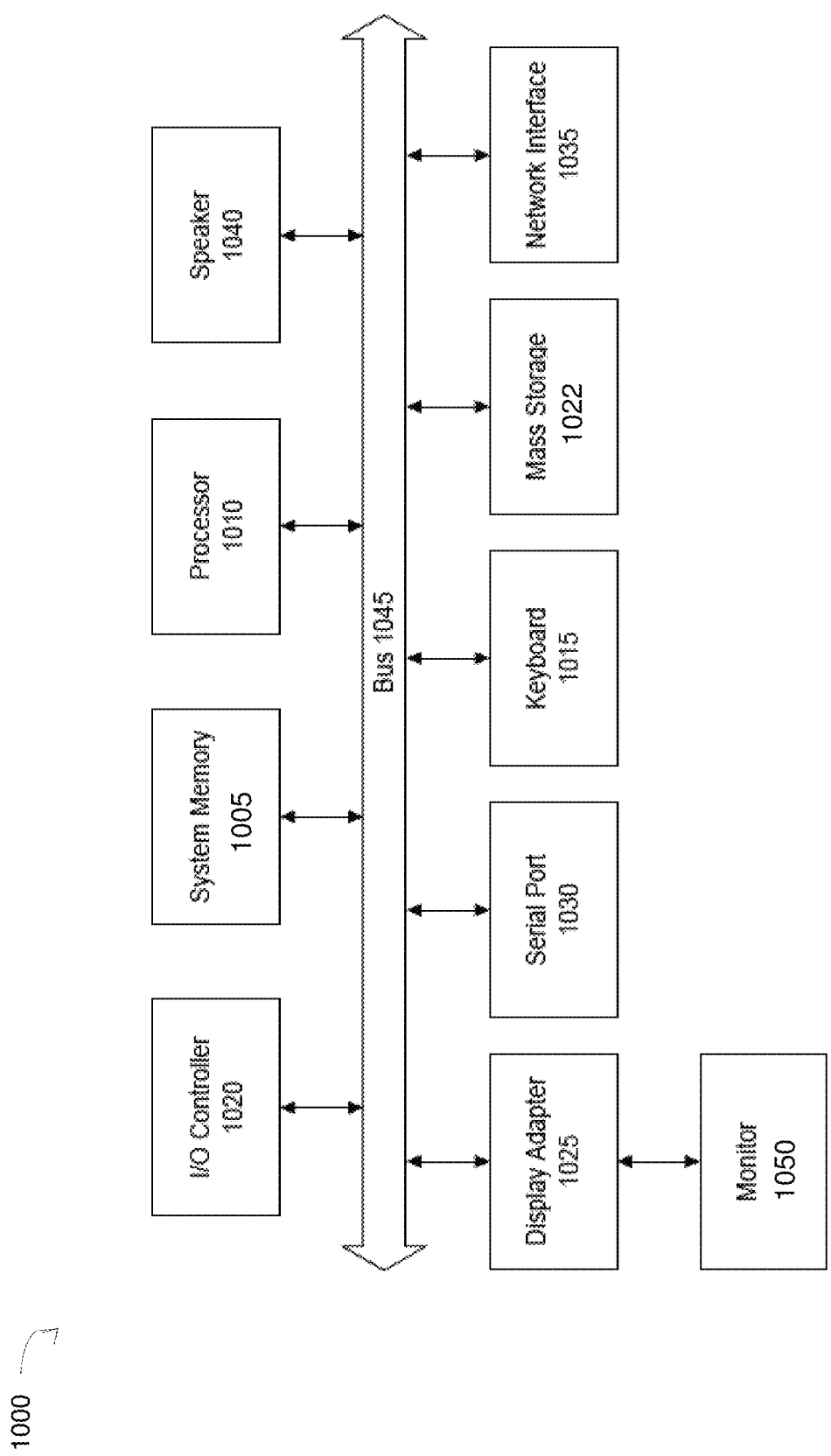
FIG. 6 shows a system block diagram of a computer or processing system used to execute one or more software components of the present system described herein.

The network environment of FIGS. 1 and 2 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer or processing system used to execute one or more software components of the present system described herein. The computer system 1005 includes a monitor 1050, keyboard 1015, and mass storage devices 1022. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory. Certain of these components, such as processor 1010 may be embodied in a device other than a standalone computer, such as in a network device 104 that is capable of executing programmed software instructions.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 6 is but an example of a computer system suitable for use with the present system.

Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®, family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method to avoid temporary traffic loss in a network, comprising:
    retaining, in each provider edge device of a first plurality of provider edge devices coupled through the network to a first host computer, path information including a MAC address for the first host computer in a control plane as a dynamic address, wherein a second host computer is coupled to the network through a second plurality of provider edge devices coupled to the first provider edge devices;
    maintaining, in each provider edge device, its own routing table listing network addresses of the other provider edge devices as multi-homed peers; and
    advertising, by a failure recovery process in each provider edge device, all multi-homed peer network addresses as addresses that each respective provider edge device has dynamically learnt in the control plane such that when a provider edge device receives a route with a locally connected host, it re-advertises the host address on its own.

2. The method of claim 1 wherein the network comprises an Ethernet network, and the first host is coupled to the second host through an Ethernet Virtual Private Network (EVPN).

3. The method of claim 2 wherein the network implements a Border Gateway Protocol (BGP) for the plurality of provider edge devices.

4. The method of claim 3 wherein the routing table contains information comprising media access control (MAC) addresses for the provider edge devices.

5. The method of claim 4 wherein the provider edge devices are part of a provider network provided by an Internet service provider (ISP) for use by the first host and the second host, and the first host and second host are part of respective customer networks, and further wherein a customer edge device is coupled to the plurality of provider edge devices through an Ethernet Segment Identifier (ESI) to denote a respective link connecting a provider edge device to the customer edge device.

6. The method of claim 4 wherein the temporary traffic loss is caused by removal of a multi-homed customer MAC address from one of the provider edge devices and temporary withdrawal from the provider edge devices even when the customer MAC address is still reachable from at least some other provider edge devices.

7. The method of claim 1 further comprising:
    maintaining in the failure recovery process a timer to control a period of re-advertisement and re-routing to the first host, the process, upon failure of a data link, removing, in the first provider edge device, the first host from a data plane; and
    generating, in the first provider edge device, a new route to advertise the first host address to cause other provider edge devices to receive the new route and adjust their respective control plane routes prior to expiration of the timer.

8. The method of claim 7, wherein a data packet hashes from one provider edge device to another provider edge device without any link failure.

9. A system for avoiding temporary traffic loss in a network, comprising:
    a first host computer;
    a second host computer coupled to the first host computer through the network;
    a first provider edge device retaining path information including a MAC address for the first host in a control plane as a dynamic address, upon indication of withdrawal of the first host from a second provider edge device; and
    a timer controlling a period of re-advertisement and re-routing of network traffic to the first host, wherein the first provider edge device removes the first host from a data plane and generates a new route to advertise the first host MAC address as an address that the first provider edge device has dynamically learnt to cause other provider edge devices to receive the new route and adjust their respective control plane routes prior to expiration of the timer.

10. The system of claim 9 wherein the control plane controls routing of the network traffic through functions including system configuration, management, and exchange of routing table information, and wherein control plane packets are sent to or originated by interface hardware of the edge devices, and wherein the other provider edge devices comprise a plurality of peers, and a peer with a next lower address acts as the first provider edge device, and a peer with a next higher address would take ownership of the dynamic address if it does not see the new route as advertised, and further wherein the data control plane moves data through the interface hardware based on information learnt by the control plane, by forwarding the data to a next hop along a defined path to a selected destination network according to control plane logic.

11. The system of claim 10 wherein the timer period sets a period to remove an address of the first host from the data plane, re-learn the address in the data-plane to generate and transmit a route advertisement, propagate the route through the network, and receive and process the route in a local edge device, and wherein the period is related to a time required to remove and withdraw the first host from the first provider edge device.

12. The system of claim 10 wherein the routing protocol comprises a border gateway protocol (BGP), and wherein the routing table information comprises MAC addresses for the provider edge devices, and further wherein the provider edge devices are part of a provider network provided by an Internet service provider (ISP) for use by the first host and the second host, wherein the first host and second host are part of respective customer networks.

13. The system of claim 12 wherein the control plane packets are processed by the interface hardware to update the topology information through updated routing table information.

14. The system of claim 13 wherein the interface hardware comprises a network switch within each provider edge device, and having a plurality of ports, and wherein the switch manages the flow of data across the network by transmitting a received network packet only to the one or more devices for which the packet is intended.

15. The system of claim 14 wherein:
the first host is connected to a first plurality of provider edge devices through a first customer edge device using a multi-homing structure to access a plurality of provider edge devices in the provider network; and
the second host is connected to a second plurality of provider edge devices through a second customer edge device using the multi-homing structure to access the plurality of provider edge devices in the provider network.

16. The system of claim 15 wherein the multi-homing structure comprises a one of a Link Aggregation or Virtual Link Trunking feature of the network interface hardware.

17. The system of claim 16 wherein a customer edge device is coupled to the plurality of provider edge devices through an Ethernet Segment Identifier (ESI) to denote a respective link connecting a provider edge device to the customer edge device.

18. The system of claim 9 wherein the temporary traffic loss is caused by a data link failure comprising at least one of: a failure of the respective data link between the provider edge device and the customer edge device, and a hashing of the customer edge device to a different provider edge device.

19. A computer program product, comprising a non-transitory computer-readable medium having a computer-readable program code embodied therein, the computer-readable program code adapted to be executed by one or more processors to perform a method of avoiding temporary traffic loss in a network, comprising:
retaining, in each provider edge device of a first plurality of provider edge devices coupled through the network to a first host computer, path information including a MAC address for the first host computer in a control plane as a dynamic address, wherein a second host computer is coupled to the network through a second plurality of provider edge devices coupled to the first provider edge devices;
maintaining, in each provider edge device, its own routing table listing network addresses of the other provider edge devices as multi-homed peers; and
advertising, by a failure recovery process in each provider edge device, all multi-homed peer network addresses as addresses that each respective provider edge device has dynamically learnt in the control plane such that when a provider edge device receives a route with a locally connected host, it re-advertises the host address on its own.

20. The computer program product of claim 19 wherein the network comprises an Ethernet network, and the first host is coupled to the second host through an Ethernet Virtual Private Network (EVPN), and implements a Border Gateway Protocol (BGP) for the plurality of provider edge devices.

* * * * *